United States Patent [19]

Stevenson et al.

[11] Patent Number: 5,067,885
[45] Date of Patent: Nov. 26, 1991

[54] RAPID CHANGE DIE ASSEMBLY

[75] Inventors: James F. Stevenson, Hudson; William H. Miller, Wadsworth, both of Ohio

[73] Assignee: GenCorp Inc., Fairlawn, Ohio

[21] Appl. No.: 478,373

[22] Filed: Feb. 12, 1990

Related U.S. Application Data

[63] Continuation-in-part of Ser. No. 207,838, Jun. 17, 1988, Pat. No. 4,906,711.

[51] Int. Cl.⁵ .................. B29C 47/24; B29C 47/22
[52] U.S. Cl. .................. 425/131.1; 264/285; 264/339; 425/381; 425/382.3; 425/463; 425/465; 425/464; 425/146
[58] Field of Search .................. 425/131.1, 380, 462, 425/464, 382.3, 146, 132, 461, 466, 463, 133.5, 381, 465, 467; 264/515, 173, 176, 167, 209.8, 171, 142, 285, 295, 177.16, 339

[56] References Cited

U.S. PATENT DOCUMENTS

| | | | |
|---|---|---|---|
| 1,618,256 | 2/1927 | Wutrrich | 425/467 |
| 2,062,338 | 12/1936 | Tanzi | 425/467 |
| 2,502,247 | 3/1950 | Clark et al. | 425/465 |
| 3,046,602 | 7/1962 | Houvener | 425/464 |
| 3,080,608 | 3/1963 | Van Niper | 425/466 |
| 3,093,860 | 3/1963 | Eilersen | 425/466 |
| 3,111,714 | 11/1963 | Branscum | 425/466 |
| 3,292,213 | 12/1966 | Donald et al. | 425/381 |
| 3,313,003 | 4/1967 | O'Brien | 425/464 |
| 3,345,444 | 10/1967 | Pratt | 264/515 |
| 3,346,918 | 10/1967 | Deleuze | 425/465 |
| 3,405,210 | 10/1968 | Heider . | |
| 3,425,092 | 2/1969 | Van Taga | 425/380 |
| 3,490,113 | 1/1970 | Bulck et al. . | |
| 3,564,652 | 2/1971 | Baugmies et al. . | |
| 3,761,213 | 9/1973 | Wight | 425/465 |
| 3,809,516 | 5/1974 | Komcki . | |
| 3,809,519 | 5/1974 | Garner | 425/132 |
| 3,822,777 | 7/1974 | Jepsen . | |
| 3,827,547 | 8/1974 | Nixon . | |
| 4,025,262 | 5/1977 | Furmon | 425/381 |
| 4,134,715 | 1/1979 | Cueto | 425/464 |

(List continued on next page.)

FOREIGN PATENT DOCUMENTS

| | | | |
|---|---|---|---|
| 2359746 | 6/1974 | Fed. Rep. of Germany | 264/295 |
| 2921943 | 12/1980 | Fed. Rep. of Germany | 425/131.1 |
| 2395123 | 2/1979 | France | 264/573 |
| 49-5903 | 2/1974 | Japan | 425/465 |
| 51-102050 | 9/1976 | Japan | 425/462 |
| 58-220717 | 12/1983 | Japan | 425/381 |
| 59-188424 | 10/1984 | Japan | 264/209.8 |
| 62-169614 | 7/1987 | Japan | 425/132 |
| 87-02932 | 5/1987 | World Int. Prop. O. . | |
| 87-05258 | 9/1987 | World Int. Prop. O. | 425/131.1 |

OTHER PUBLICATIONS

Teito Rubber Advertisement (3 pages).

Primary Examiner—Jeffery Thurlow
Assistant Examiner—Mathieu Vargot

[57] ABSTRACT

A die assembly for configuring extrudate flow is provided. The die assembly includes a die head having a feed member passage, first and second die head passages, and first and second die surfaces respectively associated with the first and second die head passages. The die head passages are located intermediate the corresponding die surfaces and the feed member passage. A feed member is supported in the feed member passage of the die head and has a feed passage and a feed opening for supplying extrudate to the die head. The feed member is supported for relative movement within the die head whereby the feed opening may be moved to communicate with either the first die head passage or the second die head passage. The central axis feed of the feed opening is moveable with respect to the central axis of the first or second die head passage to correspondingly configure extrudate exiting the respective die head passage when the feed opening is in communication with this die head passage. The die assembly may also include a switch member whereby the die assembly may be supplied with extrudate material from either a first or second extruder.

15 Claims, 4 Drawing Sheets

U.S. PATENT DOCUMENTS

| | | | |
|---|---|---|---|
| 4,219,516 | 8/1980 | Herrington, Jr. | 425/464 |
| 4,257,320 | 3/1981 | Holbrook et al. | |
| 4,276,250 | 6/1981 | Satchell et al. | 425/132 |
| 4,293,294 | 10/1981 | Rasmussen | 425/382.3 |
| 4,442,131 | 4/1984 | Nagy et al. | 425/465 |
| 4,455,133 | 6/1984 | Jakob et al. | 264/167 |
| 4,461,738 | 7/1984 | Russell | 264/167 |
| 4,479,768 | 10/1984 | Kube et al. | 264/142 |
| 4,483,812 | 11/1984 | Hahn et al. | 425/466 |
| 4,536,147 | 8/1985 | Groff | |
| 4,638,016 | 1/1987 | Zoller | 425/381 |
| 4,648,821 | 3/1987 | Thulin | 425/465 |
| 4,761,129 | 8/1988 | Aste et al. | 425/133.1 |
| 4,793,786 | 12/1988 | Greenhouse et al. | |
| 4,832,960 | 5/1989 | Compagnon | 425/131.1 |
| 4,929,167 | 5/1990 | Pepper | |

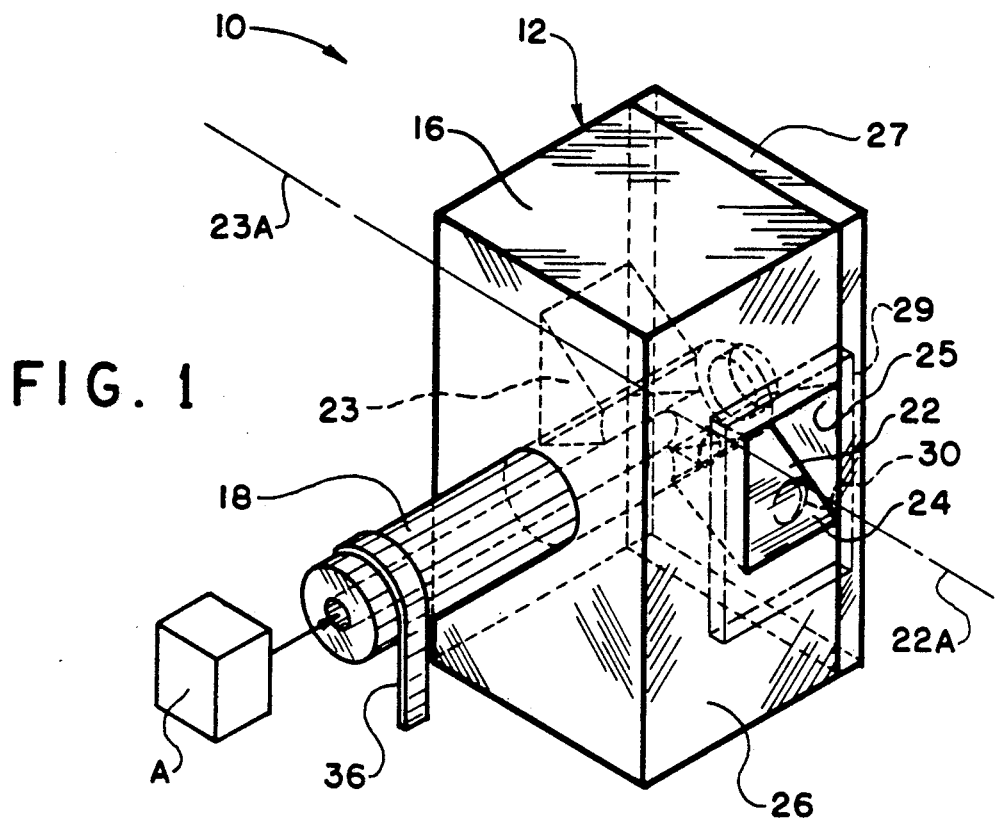
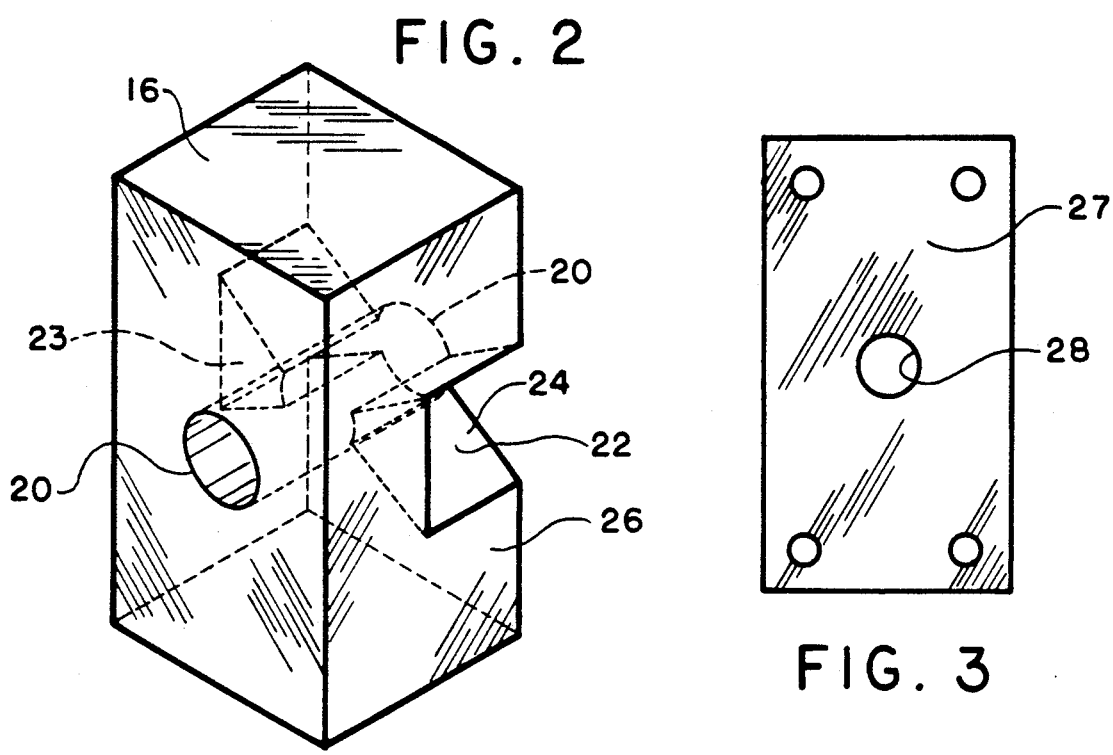

1

RAPID CHANGE DIE ASSEMBLY

This application is a continuation in part of U.S. application Ser. No. 07/207,838, filed June 17, 1988, entitled "Directed Flow Die Assembly," now U.S. Pat. No. 4,906,711.

TECHNICAL FIELD

The present invention relates to an assembly for manufacturing extrudate, and specifically to a device capable of extruding curved or straight extrudate which may be conveniently and rapidly changed to provide alternate extrudate profile configurations and alternate extrudate feed materials.

BACKGROUND ART

The process of extrusion comprising charging solid extrudable material, such as rubber, to a heat chamber of an extruder is well known in the art. The material is heated in the chamber to a flowable state and forced from the chamber through an opening in a die assembly by a rotatable screw. The extrudate is then removed using a conveyor system.

In the past, extruded products having a profile, such as rubber automobile and refrigerator door seals, have been limited to linear extruded configurations. To obtain profile seals having angular configurations, for example, individual lengths of linear extrudate were joined at their respective ends to create corners or bends to form the final seal shape, such as by a separate molding step. The additional process step increased the time and expense of manufacture and created potential operational problems. Specifically, the corner junctions of the final product might be weaker than the component lengths, which could result in potential seal failure points, or the junctions might have deformed or distorted cross-sectional configurations relative to the cross section of the extrudate lengths which are unattractive in appearance, and could cause a reduction in seal efficiency.

The discovery of a method and apparatus for continuously manufacturing curved or bent extrusions having undistorted cross-sectional shapes, as set forth in copending patent application Ser. No. 07/207,838 to Miller (assigned to the assignee of the present application), eliminated the problem of joining extrudate lengths to make curvatures or bends. However, several problems still exist with respect to changing the profile of the extrudate being manufactured.

The process of changing the profile of an extruder die assembly, or the extrudate material exiting the die assembly, typically requires shutting down the extruder and extrusion process line. If the die change takes an appreciable amount of time, it may be necessary to purge hot material from the extruder to prevent unwanted crosslinking or degradation reactions in the extrudate material. It may also be necessary for the extrudate already manufactured, but not yet completed, to be transported through the remainder of the manufacturing line by a conveyor, or other conventional method, to complete the curing, cooling or crosslinking process. Under these circumstances, restarting the line may require extrudate already manufactured to be feed by hand through the line to form a continuous extrudate. This process is time consuming and may result in considerable extrudate material being wasted. The extruder may also require cleaning to begin extrusion of a different extrudate material. This process may take from 15 minutes to several hours, depending on whether or not the extruder must be purged or the line broken, in addition to any desired profile changes.

DISCLOSURE OF THE INVENTION

The present invention provides a rapid change assembly for configuring extrudate flow, including an extruder die subassembly which may be rapidly changed to manufacture extrusions having an alternate profile configuration. An extrudate material switch subassembly is additionally provided which may be rapidly changed to supply an alternate material to the die subassembly.

The extruder die subassembly forms extrudate to a predetermined longitudinal and profile configuration, and enables rapid and convenient changes of the die to manufacture an extrusion having a different profile configuration. The extrudate material switch subassembly may also be rapidly and conveniently used to enable the manufacture of an extrusion of a different extrudate material.

The extruder die subassembly includes a die head and a feed member which may also be used to generate curved extrusions. The die head includes a feed member passage for engagement by the feed member, and first and second die head passages extending from the feed member passage. First and second die surfaces are also included on the die head. The die surfaces are each associated with a respective die head passage, so that the die head passages are located intermediate the feed member passage and their respective die surfaces. Die plates with openings for producing the desired extrudate profile configuration are secured to the respective die surfaces. It is noted that the die head may include a greater or lesser number of die head passages, each of which may include a die plate with a different extrudate profile configuration.

The feed member is supported within the feed member passage of the die head for relative movement with respect to the die head. In one embodiment of the present invention disclosed in this application, the feed member is operatively interconnected with an extrudate source for supplying extrudate material to the die head via a feed passage and a feed opening. In a second embodiment, the feed member may be operatively interconnected with the extrudate switch assembly for receiving alternate extrudate materials.

The feed opening has a first central axis, and the first and second die head passages have second and third central axes, respectively. The first central axis and second central axis are movable with respect to one another upon movement of the feed opening or first die head passage with respect to the other of the feed opening or first die head passage, respectively. The first central axis and third central axis are also movable with respect to one another upon movement of the feed opening or second die head passage with respect to the other of the feed opening or second die head passage, respectively. Movement of the axes correspondingly configures extrudate exiting one of the die head passages when the feed opening is in communication with the die head passage.

During operation of the assembly, the feed opening is in communication with either the first or second die head passages. The relative movement between the feed member and die head enables selective control of the path of extrudate material exiting the die head. As more fully set forth in co-pending Miller patent application Ser. No. 07/207,838, using the die assembly permits selective and variable bending of the extrudate as it exits the die head. The desired longitudinal curvature in the extrudate is obtained by moving the feed opening with respect to the first or second die head passage. As a result of the relative movement, the extrudate flow and the length of the pathways along which the extrudate flows as it exits the die head, are selectively varied to obtain the desired overall curved longitudinal extrudate configuration.

When it is desired to manufacture an extrusion with a different profile from the profile formed by the die plate associated with the first die feed passage, the feed member and die head are moved relative to one another so that a different profiled extrusion is produced using the die plate associated with the second die feed passage. Movement of the feed member and die head is such that the feed opening rapidly moves into communication with the second die feed passage. In this position, extrudate material is no longer supplied to the first die feed passage. The first die feed passage may thus be cleaned, and/or the die plate replaced to accommodate another die plate for forming an alternate profile. By providing the rapid change from the first die feed passage to the second die feed passage, which takes approximately one second, the extruder and manufacturing line need not be shut down to change die plates, or to perform regular cleaning of the die head or other maintenance. The extruder need not be turned off, and the old and new extrudate profiles can be quickly rejoined to maintain continuity of the line.

In a second embodiment of the rapid change assembly, the extrudate material switch subassembly is included. The switch subassembly includes a housing and a switch member having extrudate supply passages operatively interconnected between an extrudate source and the feed member for supplying extrudate material to the die head of the die subassembly. The housing supports the switch member for relative movement between positions in which the die assembly is supplied with extrudate material from either a first or second extruder.

During operation of the rapid change assembly it may be desired to manufacture an extrusion having the same profile, but of a different extrudate material. Use of the switch subassembly enables the supply of extrudate material to the die subassembly to be rapidly changed from one extruder having one type of extrudate material, to a second extruder having an alternate type of extrudate material. The housing and switch member are such that they may be rapidly moved to provide communication between the first extruder and feed member or the second extruder and feed member. When, for example, the first extruder is no longer supplying extrudate material, the extruder may be cleaned, and/or provided with an alternate extrudate material. By providing the rapid change from the first extruder to the second extruder, the extruder and manufacturing line need not be shut down during production to change materials, or to perform regular cleaning or other maintenance.

Changing feed material using the switch subassembly is preferably done while the first extruder is operating to supply material to the die head, and the second extruder having the desired replacement material is operating at a steady state. Using this preferred mode of switching minimizes interruption to line operation. Additionally, it is noted that the volume of material between the switch subassembly and the feed opening is preferably as small as possible to minimize mixing between the different extrudate materials.

These features, as well as additional advantages of the present invention, will be better understood from the following detailed description and attached drawings setting forth details of the embodiments of the invention.

BRIEF DESCRIPTION OF DRAWINGS

FIG. 1 is a perspective view of an extruder die subassembly of the rapid change assembly of the present invention.

FIG. 2 is a perspective view of a die head of an extruder die subassembly manufactured in accordance with the rapid change assembly of the present invention.

FIG. 3 shows a bottom plate of the extruder die subassembly of the present invention.

BEST MODE FOR CARRYING OUT THE INVENTION

Figure 10:
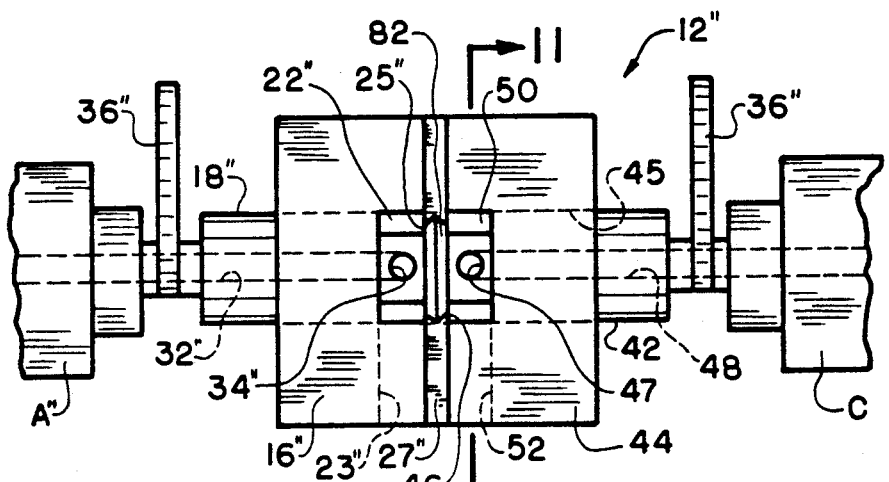
FIG. 10 is a front view of a dual extrusion embodiment of the extruder die subassembly of the rapid change assembly of the present invention.
Figure 11:
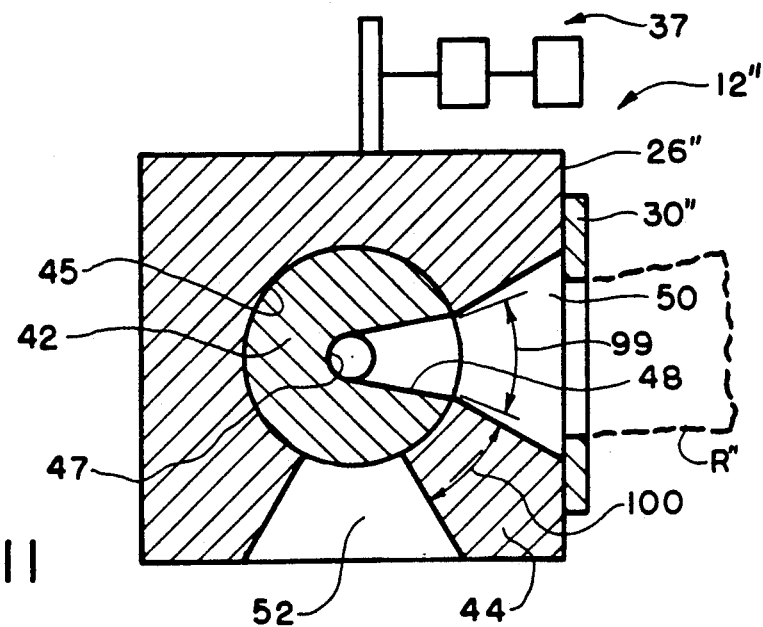
FIG. 11 is a cross-sectional view of a die head of a dual extrusion embodiment of the extruder die subassembly of the rapid change assembly, taken along the plane 11—11 of FIG. 10.
Figure 12:
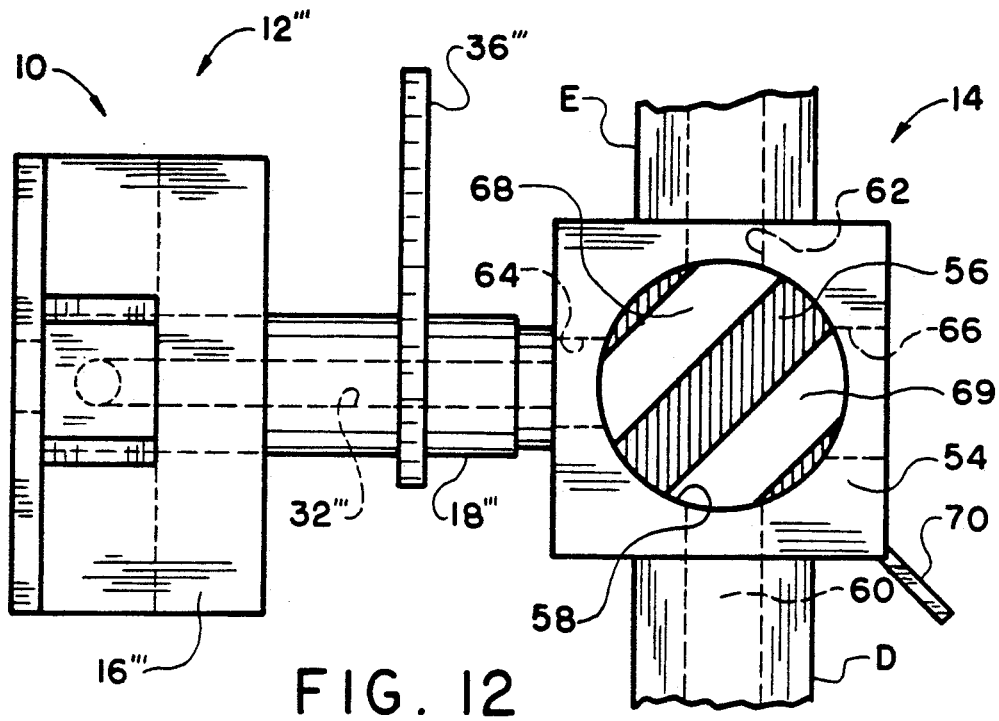
FIG. 12 is a front view of an extruder die subassembly and extrudate switch subassembly of the rapid change assembly of the present invention.
Figure 13:
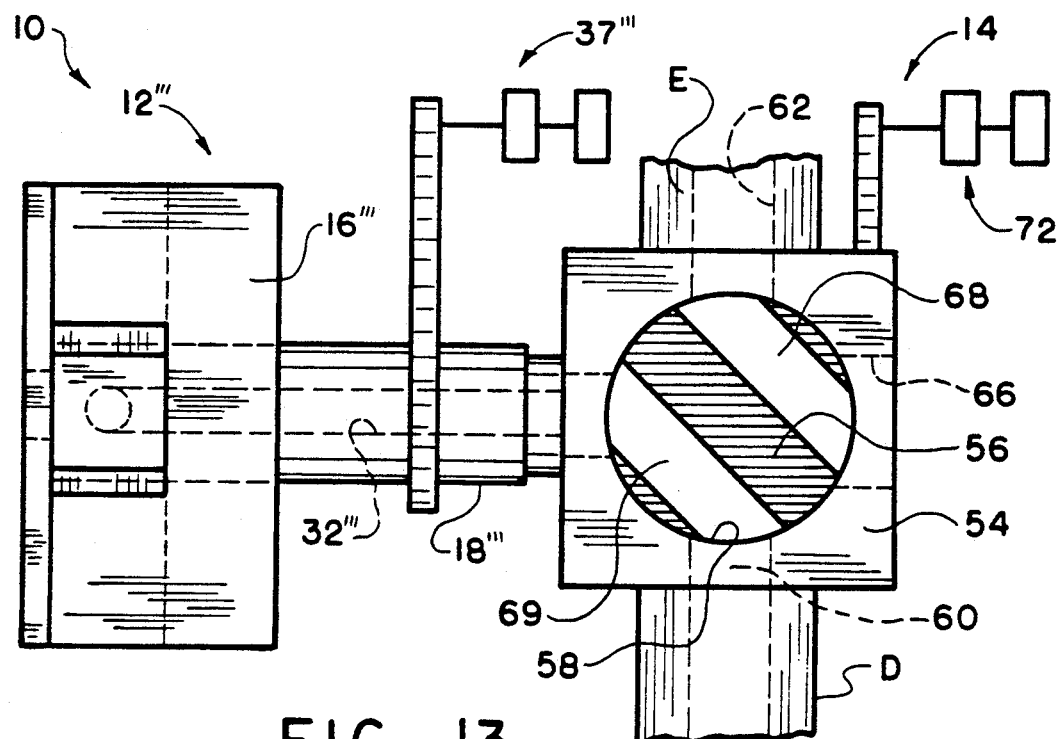
FIG. 13 is a front view of an extruder die subassembly and an alternate embodiment of an extrudate switch subassembly of the rapid change assembly of the present invention.

A rapid change assembly, indicated generally at reference numeral 10, for configuring extrusions, and which may be rapidly changed to manufacture extrusions having different profile configurations in accordance with the present invention, is illustrated in FIGS. 1, 6 and 10-13. Specifically, FIG. 1 illustrates a rapid change assembly having an extruder die subassembly 12 which controls the overall longitudinal configuration and profile of the extrudate. FIGS. 12-13 additionally illustrate a rapid change assembly having an extruder die subassembly and an extrudate switch subassembly 14 for rapidly changing the type of extrudate material which is supplied to the die subassembly. Where the structural elements are the same in these embodiments, the same reference numerals will be used, but with additional prime designations being used with respect to the second, or additional, embodiments.

Turning now to the embodiment of FIG. 1, an extruder A is shown in conjunction with the extruder die subassembly 12, which controls the overall longitudinal and profile configuration of the extrusion, by selectively varying the path and curvature of the extrudate. As schematically illustrated in the embodiment, the extruder die subassembly is mounted adjacent the extruder A which is a suitable and conventional device not disclosed in detail.

In FIG. 1, the extruder die subassembly includes a die head 16 and a cylindrical feed member 18. The die head 16 is illustrated in FIG. 2, and comprises a rectangular metal member having a feed member passage 20 comprising a cylindrical bore, for supporting the feed member 18. The die head additionally includes first and second die head passages 22, 23 extending from the feed member passage 20. Each of the die head passages includes a central axis 22A, 23A, respectively. The sides 24 of the die head passages diverge from the feed member passage toward an associated die surface 26 on the die head. The die surfaces 26 are each associated with a respective die head passage, so that each die head passage is located intermediate the feed member passage and its associated die surface.

A bottom plate 27 having an alignment opening 28 therein for aligning and centering an end post 19 of the feed member 18 in engagement with the die head, is further illustrated in FIG. 3. The bottom plate is secured to the die head 16 using conventional fasteners (not illustrated). When secured to the die head as shown in FIG. 1, the bottom plate 27 forms a side 25 of each of the die head passages.

A die plate 29 is secured to the die head 16 covering each of the die feed passages, as shown in phantom in FIG. 1. The die plate includes an opening 30 configured for producing any desired extrudate profile configuration. It is understood that the die head illustrated could be configured in a variety of geometrical shapes in order to include additional feed member passages and associated die surfaces, as may be desired. Additionally, each die surface 26 may include a die plate 29 having a different shaped opening 30 for manufacturing extrusions of a desired profile configuration.

Figure 6:
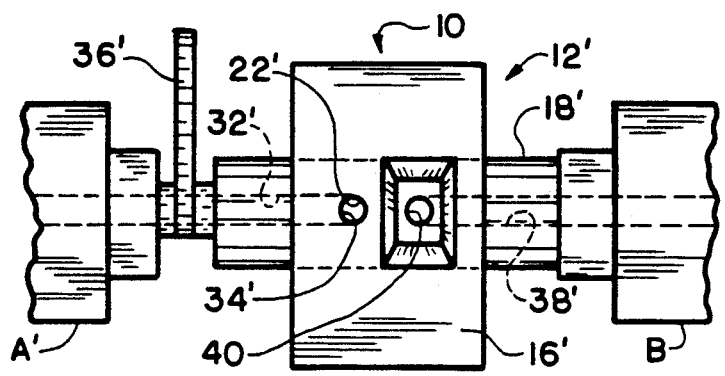
FIG. 6 is a front view of a coating embodiment of the extruder die subassembly of the rapid change assembly of the present invention.

The feed member 18 is supported within the feed member passage 20 of the die head 16 for relative movement with respect to the die head. In the embodiment of the invention illustrated in FIG. 1, the cylindrical feed member 18 is rotatable with respect to the die head 16 within the feed member passage 20. The feed member, as further illustrated in FIGS. 4 and 5, includes a feed passage 32 comprising a cylindrical bore, and having a feed passage axis 32A. A feed opening 34 is also included having an axis 34A, which, in the embodiment illustrated in FIG. 6, is perpendicular to the feed passage axis 32A.

Figures 4, 5:
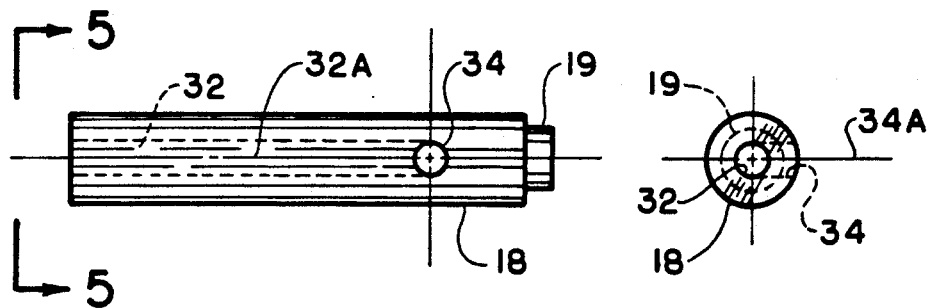
FIG. 4 is a side view of a feed member of the extruder die subassembly of the present invention.
FIG. 5 is an end view of the feed member of the extruder die subassembly, taken along the plane 5—5 of FIG. 4.

In the embodiment of the invention shown in FIGS. 1 and 2, the feed member 18 is operatively interconnected with the extruder A. During the manufacture of extrusions using the rapid change assembly, extrudate material flows from the extruder A via the feed passage 32 and feed opening 34 into either the first or second die feed passage 22, 23. Since the feed member is rotatable within the die head 16, either the first or second die head passage may be selected, depending upon which passage is adjacent the die plate for forming the desired extrusion profile. The desired feed passage is selected by either manually rotating a handle member 36 secured to the feed member 18, as shown in FIGS. 1 and 5, so that the feed opening 34 and desired die feed passage are in communication. Alternatively, the feed member 18 may be coupled to computer controlled hydraulic, pneumatic or other actuators (not illustrated).

The feed member 18 may be moved rapidly within the die head 16, so that, for example, in about 1 second the feed opening 34 may be changed from communication with the first die feed passage 22 into communication with the second die feed passage 23. Once the feed opening 34 is in communication with the second die feed passage 23, extrudate material is no longer supplied to the first die feed passage 22, and that passage may then be cleaned, or the die plate 29 may be replaced with another die plate for forming yet another desired extrusion profile. Because the assembly is capable of changing from one profile extrusion to another very rapidly, the present invention eliminates the need to shut down the extruder and manufacturing line for die changes or maintenance.

In addition to using the movement of the feed member 18 between die feed passages to make rapid extrusion profile changes, selective movement of the feed opening 34 with respect to the individual die feed passages, also controls the path and curvature of the extrudate. Movement of the feed member 18 to obtain angles or curves in the desired predetermined overall configuration of the extrudate is accomplished by varying the pathway along which the extrudate travels to the die plate opening. Varying the length of the pathway causes the extrudate to bend as it exits the rapid change assembly 10. Movement between the feed opening and die feed passage, also results in relative movement between the feed opening axis 34A and the die head passage axis 22A or 23A. Movement of the axes with respect to one another correspondingly configures extrudate exiting the die head passage. The relative movement for bending the extrudate to the desired overall predetermined configuration is provided either by manual movement of the handle member by a skilled operator, or computer controlled using interconnecting actuators, as described above.

An alternate embodiment of the extruder die subassembly 12' for manufacturing extrusions having a coating of a different extrudate material, is illustrated in FIG. 6. In the alternate coating embodiment, the feed member 18' is in communication with one extruder A', is supported within the die head 16', and extends through the die head into engagment with a second extruder B. The feed member is thus operatively interconnected at both of its ends with different extruders, each supplying extrudate material.

Figure 7:
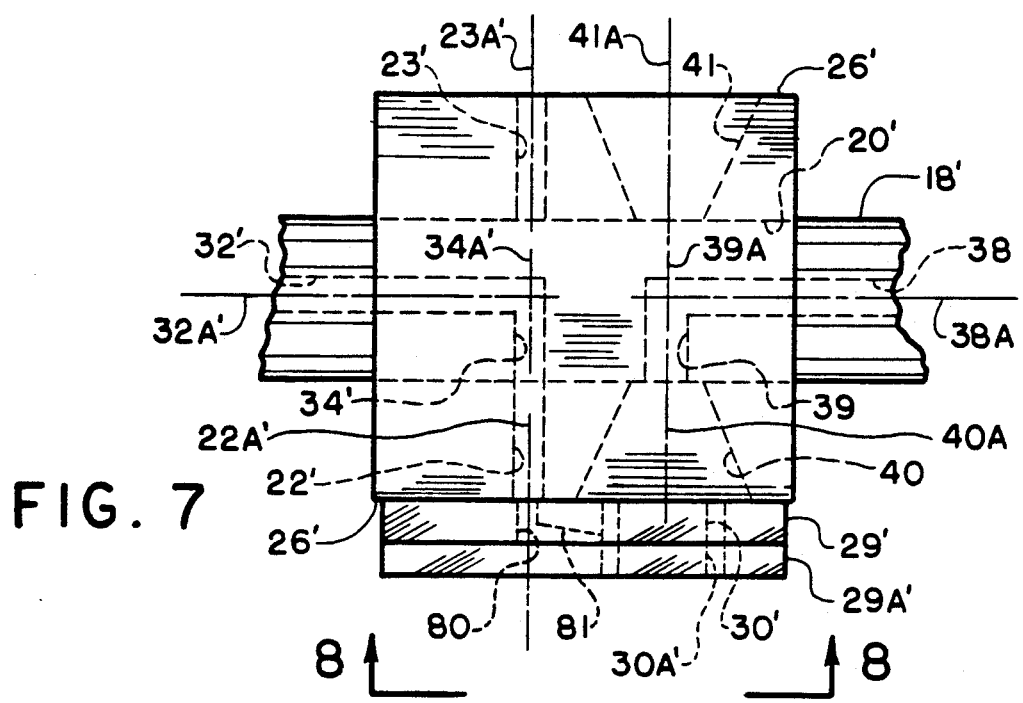
FIG. 7 is a top view of the die head, feed member and die plate of the coating embodiment of the extruder die assembly of the present invention.

The feed member illustrated in FIG. 7 includes a feed passage 32' and feed opening 34' in communication with an extruder A'. Additionally, a second feed passage 38 and second feed opening 40 are also provided. The second feed passage 38 comprises a cylindrical bore, and has a second feed passage axis 38A. The second feed opening 39 also includes an axis 39A, which, in the embodiment illustrated in FIG. 7 is perpendicular to the second feed passage axis 38A.

In the illustrated coating die subassembly embodiment, the feed passage axis 32A', and the second feed passage axis 38A are parallel and extend axially of the feed member 18' in opposite directions. The feed opening axis 34A' and second feed opening axis 39A are also parallel as shown in FIG. 7. In the configuration of the feed member illustrated in FIG. 7 the feed opening 34' and second feed opening 39 are spaced from one another to provide extrudate material to the first die head passage 22' and a third die head passage 40, respectively. In this alternate embodiment, the first and second die head passages 22', 23' comprise cylindrical bores extending outwardly from the feed passage 20' toward the die surface 26'. Each of the die head passages includes a central axis 22A', 23A'. A fourth die head passage 41 is also provided in the die head opposite the third die head passage 40, and includes a central axis 41A.

Figure 8:
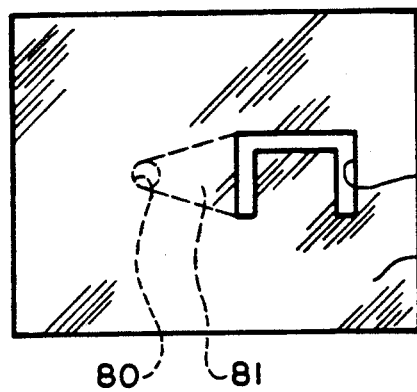
FIG. 8 is a front view of the die plate of the coating embodiment of the extruder die subassembly, taken along the plane 8—8 of FIG. 7.
Figure 9:
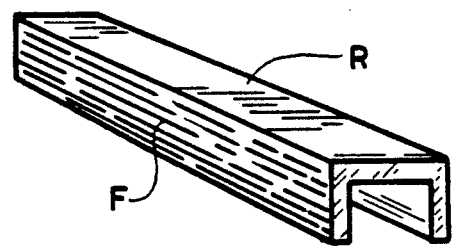
FIG. 9 is a view of a coated extrudate manufactured using the coating embodiment of the extruder die subassembly of the rapid change assembly of the present invention.

The die plate 29' provided in the coating embodiment is illustrated in FIGS. 7 and 8. The die plate is provided in two parts 29', 29A', with the first part 29' secured to the die surface 26' of the die head 16'. The die plate is secured to the die head by conventional means covering the first and third die head passages 34', 40. The first part of the die plate includes an opening 30' configured for producing the desired extrudate profile, and a bore 80 for receiving the coating extrudate to be provided on the extrusion being manufactured. As shown in FIGS. 7 and 8, the bore 80 has a cut-away portion 81 providing communication between the bore 80 and the die opening 30'. The second part 29A' of the die plate is secured to the first part of the die plate 29', also by conventional means, and includes a die opening 30A' conforming to the die opening 30'. With this configuration, the die openings in both the first and second parts of the die plate are aligned once the plates are secured together. Using this embodiment of the die plate, extrudate material from extruder B exiting from the third die head passage 40 is coated on the surface of one leg with extrudate material from extruder A' exiting from the first die head passage 22'. Upon exiting the die head, the coated extrusion R has a configuration of the type shown in FIG. 9, having extrudate F from extruder A' coated on one leg thereof.

The die head 16' in the coating embodiment of FIG. 6 is provided with first and second die head passages 22', 23', and third and fourth die head passages 40, 41. As with the embodiments of FIGS. 1-5, the feed member 18' of the coating embodiment may thus be rapidly changed from a position wherein the feed openings 34', 39 are in communication with the first and third die head passages 22', 40, to a position wherein the feed openings are in communication with the second and fourth die head passages 23', 41 to manufacture a coated extrusion having a different desired profile. This is accomplished in the manner previously discussed with respect to the rapid change assembly of FIG. 1. The feed member 18' is rotated within the die head using either a handle member 36' as in FIG. 6, or a computor coupled with an actuating device (not illustrated), as previously described.

A second alternate embodiment of the extruder die subassembly for manufacturing extrusions having a dual extrusion profile of different extrudate materials, is illustrated generally in FIGS. 10 and 11 by reference number 12''.

In the alternate dual extrusion embodiment, the feed member 18'' is supported within the die head 16'', and a second feed member 42 is supported within a second die head 44. Alternatively, a single elongated feed member (not illustrated) may be used in lieu of two opposing feed members. In the event a single feed member is substituted for the first and second feed members 18'', 42, the single feed member extends through an aperture in the bottom plate 27'', and is rotated using a single handle member 36'', or a single coupling to a computer controlling and actuating device, similar to those illustrated in FIG. 11, and previously described. In the single feed member embodiment, the overall longitudinal configuration of both extrudate material portions of the extrusion is the same, since the rotation of both feed openings is simultaneous.

In the two feed member embodiment illustrated in FIG. 10, the second die head 44 includes a feed member passage 45 comprising a cylindrical bore for supporting the second feed member 42. The die head additionally includes first and second die head passages 50, 52, which extend from the feed member passage 45.

As shown in FIGS. 10 and 11, the bottom plate 27'' is engaged intermediate the die head 16'' and second die head 44. When two feed members are used, the bottom plate includes alignment openings (not illustrated) on each surface engaged with a die head. The alignment openings in the bottom plate are preferably engaged with the first and second feed members for centering the feed members in proper operating position. When secured between the die heads, the bottom plate 27'' forms a side 25'' of the die head passages 22'', 23'' on the one die head 16, and a side 46 of the die head passages 50, 52 on the second die head 44.

The feed members 18'', 42, include feed passages 32'', 48 and feed openings 34'', 47, each of which are in communication with a respective extruder A'', C. When extruding material through the first die head passages 22'', 50, the feed openings 34'', 47 are in communication with the die head passage 22'', 50, as illustrated in FIG. 10. When it is desired to extrude material through the second die head passages 23'', 52, for example, to obtain another desired extrusion profile using another die plate, the feed members are rapidly, and simultaneously, moved within their respective die heads.

Once the feed openings 34'', 47 of the feed members 18'', 42 are in communication with the second die head passages 23'', 52, extrudate material is no longer supplied to the first die head passages, and the passages or their respective die plates, may be cleaned or replaced as set forth above, while continuing to operate the extruders and manufacturing line. A tapered divider plate 82 is also provided on the bottom plate 27'', so that extrudate materials exiting the die head passages 22'', 50, are in communication with one another upon entering the die opening 30''.

Additionally, in the preferred embodiment of the die heads 16'', 44, and as illustrated in FIG. 11, the diameter of the feed opening 48, generally referenced at arc 99, is larger than arc, generally referenced at 100, defined by the die head between the first and second die head passages 50, 52. With this configuration the danger of obstructing the flow of extrudate, or of dead-ending extrudate within the die head and thereby building up pressure within the die head, is substantially reduced. Such obstruction is reduced when the feed opening arc 99 is larger than the arc 100 between the die head passages, since the feed opening cannot be completely blocked, even if it is incorrectly moved to a position between the die head passages. To further avoid incorrect positioning of the feed member, mechanical stops (not illustrated) external to the die head may be used to ensure that the feed opening is consistently rotated to a properly aligned position with respect to the desired die head passage. Such mechanical stops are also provided to properly position the feed member to obtain the desired predetermined longitudinal extrudate configuration.

Operation of the feed members 18''', 42 with respect to rapid movement for obtaining angles or curves in the desired predetermined overall configuration, is obtained using the handle members 36'' shown in FIG. 10, or computer controlled hydraulic, pneumatic or other actuators, as schematically illustrated and generally referenced at 37 in FIG. 11. Such operation is substantially similar to the operations described above, and thus is not further described in detail. However, it is noted that the use of two feed members in the dual extrusion profile embodiment of the extruder die subassembly enables the operator to simultaneously, or individually, vary the length of the pathway of each portion of the extrudate R''. By varying the pathways of the different material portions of the extrudate individually, a single extrusion profile is provided wherein the portions of the extrudate manufactured of different extrudate materials may vary with respect to one another in configuration.

In a second embodiment of the invention illustrated in FIGS. 12-13, an extruder die subassembly, generally referenced at 12''', of the type previously discussed with respect to FIG. 1, is operatively interconnected with the extrudate switch subassembly, generally referenced at 14. The extrudate switch subassembly 14 is interconnected with two extruders D or E, such that extrudate material supplied to the extruder die subassembly 12''', may be rapidly changed to a different desired extrudate material.

As shown in FIG. 12, the extrudate switch sub-assembly 14 includes a housing 54 and a switch member 56. The housing 54 is interconnected with a feed member 18''' of the extruder die subassembly 12''', and includes a cylindrical bore 58 for supporting the switch member. The bore 58 is centrally positioned and extends longitudinally within the housing of the bore. The housing additionally includes first and second supply passages 60, 62, each of which is in communication with a respective extruder D or E. An extruder passage 64 is also provided in the housing, and is in communication with the feed passage 32''' of the feed member 18''' of the extruder die subassembly. Each of the first and second supply passages and extruder passage comprise cylindrical bores in communication with the bore 58 of the housing and extending therefrom.

A dump port 66 is additionally provided in the housing, which also comprises a cylindrical bore in communication with the bore 58 of the housing and extending therefrom. Using the dump port, extrudate material from either of the extruders D or E may be vented from the housing as desired.

In the embodiments of both FIGS. 12 and 13, the switch member 56 comprises a cylindrical member engaged within the bore 58. During operational engagement of the switch member within the housing, the switch member is rotatable between positions, so that the feed passage 32''' of the feed member 18''' may be selectively positioned in communication with either of the extruders D or E, for supplying different extrudate materials to the extruder die subassembly 12'''.

The switch member is moved between positions by either manually moving a handle member 70, as in FIG. 12, which is secured to the switch member 56. Alternatively, the switch member may be coupled to computer controlled hydraulic, pneumatic or other actuators as previously discussed, and schematically illustrated and generally referenced at 72 in FIG. 13.

The switch member 56 includes first and second switch passages 68, 69 extending through the switch member. As illustrated, the switch passages are positioned parallel to one another within the switch member. Such passages ensure that each extruder D or E is in communication with a passage to avoid the pumping of material intermediate the switch member and housing which may interfere with operation.

When it is desired to supply extrudate from the extruder E to the feed member 18''' via a housing supply passage 62, first switch passage 68 to the feed passage 32''' the switch member 56 is moved to the position illustrated in FIG. 12. When it is desired to change extrudate materials, and provide material to the die head from extruder D, the switch subassembly is moved to its second position, illustrated in FIG. 13. In this position, extrudate is supplied from said second extruder through a housing supply passage 60, second switch passage 69 to the feed passage 32'''.

The dump port 66 is provided for removing undesired extrudate material from the extruder switch assembly. By providing a dump port, neither of the extruders D, E are required to be shut down during operation of the switch subassembly. The extruder currently supplying extrudate material continues to operate until after the switch is complete, and the extruder supplying the new material is allowed to operate at a steady state prior to the switch. The extrudate material not being supplied to the feed member 32''' exits the housing 54 via the dump port 66 to minimize any interference from excess extrudate material.

It should be apparent from the foregoing that changes may be made in the details of construction and configuration without departing from the scope and spirit of the invention as defined in the following claims.

We claim:

1. A die assembly for configuring extrudate flow, said assembly comprising, a die head having a feed member passage, first and second die head passages, and first and second die surfaces, each located in a separate plane, and associated with said first and second die head passages, said die head passages located intermediate said corresponding die surfaces and said feed member passage, a feed member supported in said feed member passage of said die head for rotation therein for communication with either said first die head passage or said second die head passage and having a longitudinal feed passage and a feed opening, wherein said feed opening is transverse with respect to said feed passage to provide extrudate flow from an extruder to said die head, said feed opening having a first central axis, said first die head passage having a second central axis and said second die head passage having a third central axis, said first central axis and said second central axis being movable with respect to one another upon movement of the feed opening or first die head passage with respect to the other of the feed opening or first die head passage, respectively, to correspondingly configure extrudate exiting the first die had passage when said feed opening is in communication with said first die head passage by varying the length of pathways along which extrudate flows through said second die head passage to said second die surface to bend the extrudate as its exits said die head, and said first central axis and said third central axis also being movable with respect to one another upon movement of the feed opening or second die head passage with respect to the other of the feed opening or second die head passage, respectively, to correspondingly configure extrudate exiting the second die head passage when said feed opening is in communication with said second die head passage by varying the length of pathways along which extrudate flows through said second die head passage to said second die surface to bend the extrudate as it exits said die head.

2. The die assembly of claim 1 wherein said feed member includes a second feed passage and second feed opening for supplying extrudate to said die head, said second feed opening having a fourth central axis which is substantially parallel to the first central axis, and said fourth central axis is movable with said first central axis with respect to the second and third central axes.

3. The die assembly of claim 2 wherein said first and second feed passages of said feed member supply extrudate from different extruders to said die head.

4. The die assembly of claim 3 having third and fourth die head passages adjacent said first and second die head passages, respectively, and said third and fourth die head passages are in communication with said second feed passage and said first and second die head passages are in communication with said first feed passage.

5. The die assembly of claim 4 wherein a second die head is provided adjacent to and fixedly interconnected with said die head, and includes a second feed member passage axially aligned with said feed member passage for supporting a portion of said feed member having said second feed passage and second feed opening, and third and fourth die surfaces associated with said third and fourth die head passages, respectively, and intermediate said corresponding third and fourth die surfaces and first and second feed member passages, respectively.

6. The die assembly of claim 5 wherein a divider separates said first and third die head passages and said second and fourth die head passages.

7. The die assembly of claims 2, 5 or 6 wherein said feed opening and second feed opening are spaced from one another and in communication with said first and second die head passages, respectively, or said third and fourth die head passages, respectively.

8. The die assembly of claim 7 wherein said feed passage and second feed passage extend longitudinally of said feed member, and at right angles to the feed opening, second feed opening, and first and fourth central axes.

9. The die assembly of claim 8 wherein said feed member includes a first end for supplying extrudate to said first feed passage and first or second die head passages from an extruder, and a second end for supplying extrudate to said second feed passage and third or fourth die head passages from a different extruder.

10. The die assembly of claim 9 wherein said die head passages diverge from a respective feed opening in a direction toward their associated die surfaces.

11. The die assembly of claim 7 wherein said first and third die surfaces include a first die plate mounted thereon, and said second and fourth die surfaces include a second die plate mounted thereon.

12. The die assembly of claims 2, 5 or 11 wherein said die plates include a first die opening in fluid communication with their respective die head passages.

13. The die assembly of claim 12 wherein said die plates further include a second die opening also in fluid communication with their respective die head passages.

14. An assembly for configuring extrudate flow, said assembly comprising, a die assembly and an extruder switch assembly, said die assembly including a die head and a feed member, said die head having a feed member passage, first and second die head passages, and first and second die surfaces, each located in a separate plane, and associated with said first and second die head passages, said die head passages located intermediate said corresponding die surfaces and said feed passage, said feed member supported in said die head for rotation therein for communication with either said first die head passage or said second die head passage, and having a longitudinal feed passage and a feed opening which is transverse with respect to said feed passage to provide extrudate flow from an extruder to said die head, said feed opening having a first central axis, said first die head passage having a second central axis, and said second die head passage having a third central axis, said first central axis and second central axis being movable with respect to one another upon movement of the feed opening or first die head passage with respect to the other of the feed opening or first die head passage, respectively, to correspondingly configure extrudate exiting the first die head passage when said feed opening is in communication with said first die head passage by varying the length of pathways along which extrudate flows through said second die head passage to said second die surface to bend the extrudate as it exits said die head, said first central axis and said second central axis also being movable with respect to one another upon movement of the feed opening or second die head passage with respect to the other of the feed opening or second die head passage, respectively, to correspondingly configure extrudate exiting the second die head passage when said feed opening is in communication with said second die head passage by varying the length of pathways along which extrudate flows through said second die head passage to said second die surface to bend the extrudate as its exits said die head, said extruder switch assembly including a housing and a switch member, said housing supporting said switch member for movement between first and second positions, and being in communication with said die assembly and either first or second extruders for supplying different extrudate materials to said die assembly, and said switch member having first and second supply passages, said switch member in its first position supplying extrudate from said first extruder through said first supply passage to said feed passage of said die head feed member, and in its second position supplying extrudate from said second extruder through said second supply passage to said feed passage of said die head member.

15. The assembly of claim 14 wherein said extruder switch assembly housing includes a vent for removing undesired extrudate material from said extruder switch assembly.

* * * * *